US011798420B2

(12) United States Patent
Matsuoka

(10) Patent No.: US 11,798,420 B2
(45) Date of Patent: Oct. 24, 2023

(54) INFORMATION PROCESSING APPARATUS, INFORMATION PROCESSING METHOD, AND STORAGE MEDIUM

(71) Applicant: TOYOTA JIDOSHA KABUSHIKI KAISHA, Toyota (JP)

(72) Inventor: Katsuhiro Matsuoka, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 38 days.

(21) Appl. No.: 17/555,664

(22) Filed: Dec. 20, 2021

(65) Prior Publication Data

US 2022/0208008 A1 Jun. 30, 2022

(30) Foreign Application Priority Data

Dec. 25, 2020 (JP) ................................ 2020-217188

(51) Int. Cl.
*G08G 1/16* (2006.01)
*G08G 1/01* (2006.01)
*G08G 1/07* (2006.01)
*G06V 20/58* (2022.01)
*B60Q 9/00* (2006.01)

(52) U.S. Cl.
CPC ............. *G08G 1/166* (2013.01); *B60Q 9/008* (2013.01); *G06V 20/582* (2022.01); *G08G 1/0116* (2013.01); *G08G 1/07* (2013.01)

(58) Field of Classification Search
CPC .......... G08G 1/66; G08G 1/0116; G08G 1/07; G06V 20/582; B60Q 9/008
See application file for complete search history.

(56) References Cited

U.S. PATENT DOCUMENTS

| 10,553,115 | B1 | 2/2020 | Ismaili et al. |
| 2017/0278398 | A1 | 9/2017 | Kato et al. |
| 2018/0261096 | A1 | 9/2018 | Kato et al. |
| 2019/0012912 | A1* | 1/2019 | Kim ................ G08G 1/096716 |
| 2019/0206236 | A1* | 7/2019 | Tao ....................... G05D 1/0276 |
| 2019/0251838 | A1* | 8/2019 | Bernhardt .............. G08G 1/087 |
| 2020/0242922 | A1* | 7/2020 | Dulberg ................ G08G 1/012 |
| 2020/0265719 | A1* | 8/2020 | Swan .................... G08G 1/166 |
| 2020/0365015 | A1* | 11/2020 | Nguyen ............... G08G 1/0129 |
| 2021/0174677 | A1* | 6/2021 | Oh ......................... G08G 1/095 |

FOREIGN PATENT DOCUMENTS

| CN | 103065502 A | 4/2013 |
| CN | 105160939 A | 12/2015 |
| JP | 2017-174055 A | 9/2017 |

* cited by examiner

*Primary Examiner* — Sisay Yacob
(74) *Attorney, Agent, or Firm* — Sughrue Mion, PLLC

(57) ABSTRACT

An information processing apparatus for being mounted on a vehicle, comprises a controller. The controller is configured to: determine that a call for attention toward a risk of collision is being made to a driver of a crossing vehicle that is a vehicle whose path crosses that of an own vehicle; and perform a predetermined process for risk avoidance, in a case where the call for attention is being made in the crossing vehicle.

15 Claims, 16 Drawing Sheets

ROADSIDE DATA

| INTER-SECTION ID | POSITION INFOR-MATION | TRAFFIC LIGHT ID | BEARING OF CONNECTING ROAD | CYCLE INFOR-MATION | CURRENT STATE | REMAINING TIME |
|---|---|---|---|---|---|---|
| 1001 | ⋮ | S001 (301A) | 0° | GREEN 60 SECS YELLOW 5 SECS RED 50 SECS | GREEN | 20 SECS |
| 1001 | ⋮ | S002 (301B) | 180° | GREEN 60 SECS YELLOW 5 SECS RED 50 SECS | GREEN | 20 SECS |
| 1001 | ⋮ | S003 (301C) | 90° | GREEN 50 SECS YELLOW 5 SECS RED 60 SECS | RED | 25 SECS |
| 1001 | ⋮ | S004 (301D) | 270° | GREEN 50 SECS YELLOW 5 SECS RED 60 SECS | RED | 25 SECS |

VEHICLE DATA

| VEHICLE ID | POSITION INFORMATION | TRAVEL DIRECTION | SPEED | ... | WARNING FLAG |
|---|---|---|---|---|---|
| V001 | ... | 90° | 35km/h | ... | 0 |

{601 braces the WARNING FLAG column}

CASE OF USING TRAVEL DIRECTION

CASE OF USING TRAVEL DIRECTION AND STEERING ANGLE

__US 11,798,420 B2__

INFORMATION PROCESSING APPARATUS, INFORMATION PROCESSING METHOD, AND STORAGE MEDIUM

CROSS REFERENCE TO THE RELATED APPLICATION

This application claims the benefit of Japanese Patent Application No. 2020-217188, filed on Dec. 25, 2020, which is hereby incorporated by reference herein in its entirety.

BACKGROUND

Technical Field

The present disclosure relates to a technology for controlling traveling of a vehicle.

Description of the Related Art

There is a system for preventing head-on collisions. For example, a warning about a risk of a collision may be issued in advance by vehicles exchanging position information.

However, with such a system, a warning is possibly issued at a place where there is a low possibility of a collision, such as at an intersection with traffic lights or at a grade separation. For example, to cope with such a situation, Japanese Patent Laid-Open No. 2017-174055 discloses a system for preventing an alert for preventing a collision from being issued at an intersection with traffic lights.

SUMMARY

An object of the present disclosure is to ensure safety at the time of traveling of a vehicle.

The present disclosure in its one aspect provides an information processing apparatus for being mounted on a vehicle, the information processing apparatus comprising a controller configured to: determine that a call for attention toward a risk of collision is being made to a driver of a crossing vehicle that is a vehicle whose path crosses that of an own vehicle; and perform a predetermined process for risk avoidance, in a case where the call for attention is being made in the crossing vehicle.

The present disclosure in its another aspect provides an information processing apparatus for being mounted on a vehicle, the information processing apparatus comprising a controller configured to: make a call for attention toward a risk of collision to a driver of an own vehicle based on first data; transmit, to outside, second data indicating that the call for attention is made, in a case where the call for attention is made; and perform a predetermined process for risk avoidance, in a case where the second data is received from a crossing vehicle that is a vehicle whose path crosses that of the own vehicle.

The present disclosure in its another aspect provides an information processing method that is performed by a vehicle, the information processing method comprising: determining that a call for attention toward a risk of collision is being made to a driver of a crossing vehicle that is a vehicle whose path crosses that of an own vehicle; and performing a predetermined process for risk avoidance, in a case where the call for attention is being made in the crossing vehicle.

Furthermore, as another mode, there may be cited a program for causing a computer to perform the information processing method described above, or a non-transitory computer-readable storage medium storing the program.

According to the present disclosure, safety at the time of traveling of a vehicle may be ensured.

BRIEF DESCRIPTION OF THE DRAWINGS

FIG. 4 is an example of roadside data that is transmitted from the roadside unit;

FIG. 6 is an example of vehicle data that is transmitted from the vehicle-mounted terminal;

DESCRIPTION OF THE EMBODIMENTS

Figure 1:
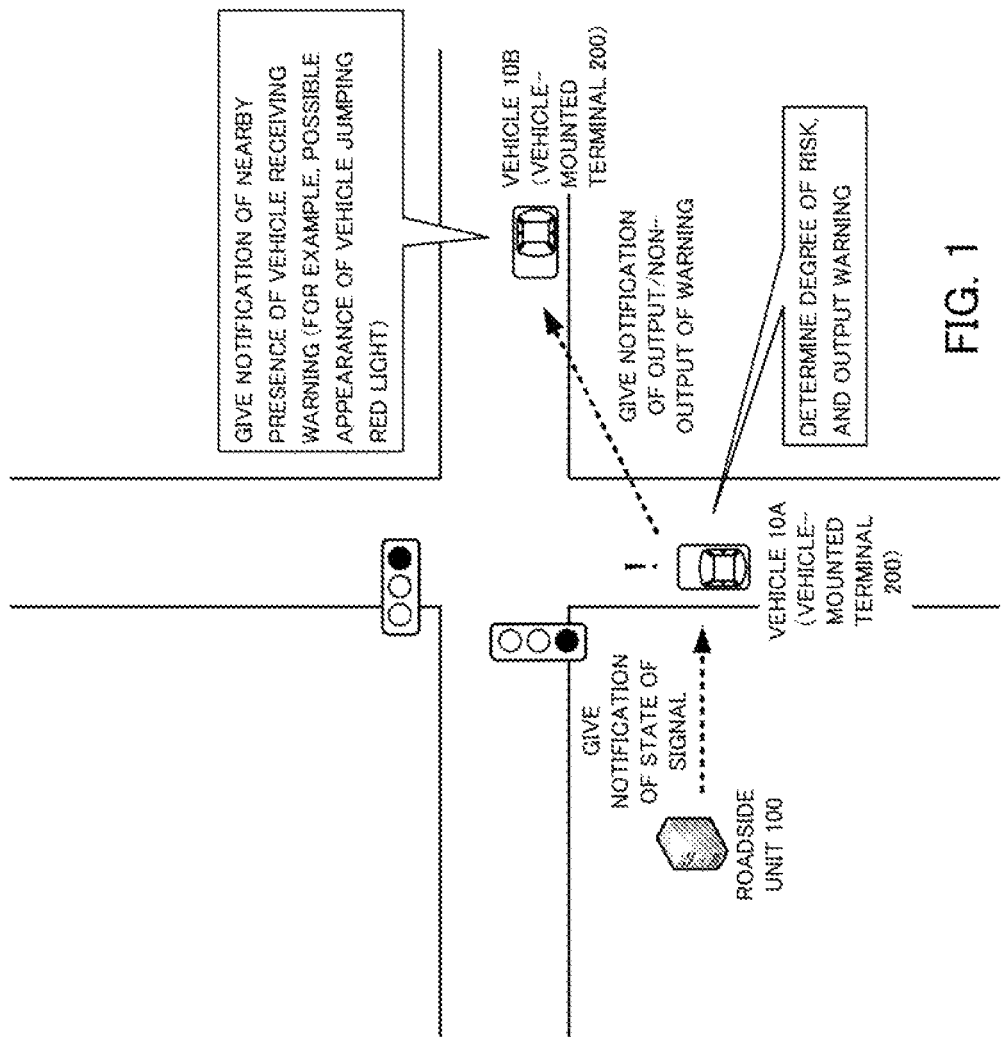
FIG. 1 is a schematic diagram illustrating a vehicle system according to an embodiment.

A vehicle system according to a present embodiment is a system including a roadside unit, and a plurality of vehicle-mounted terminals mounted on a plurality of vehicles, respectively.

A first mode of the present disclosure is a vehicle-mounted terminal (an information processing apparatus) for being mounted on a vehicle.

Specifically, there is included a controller configured to: determine that a call for attention toward a risk of collision is being made to a driver of a crossing vehicle that is a vehicle whose path crosses that of an own vehicle, and perform a predetermined process for risk avoidance, in a case where the call for attention is being made in the crossing vehicle.

The crossing vehicle is a vehicle whose path (trajectory) crosses that of the own vehicle, or in other words, a vehicle that will possibly collide into the own vehicle.

The controller determines that the call for attention toward a collision is being made in the crossing vehicle. Typically, the call for attention is made to warn of a possibility of red light jumping, but this is not restrictive. The call for attention may be made by an apparatus that is mounted on the crossing vehicle.

In the case where the call for attention is being made in a crossing vehicle, the crossing vehicle can be said to be in a state where there is a high risk of collision, such as a state where a spot where a momentary stop is required or a red light is not being noticed. Accordingly, in such a case, the controller takes measures to prevent a collision in relation to the own vehicle. As the predetermined process, for example, there may be cited a process of notifying a driver of the possibility of sudden appearance of the crossing vehicle, or a process of automatically applying a brake in the vehicle.

Furthermore, the controller may determine that the call for attention is being made in the crossing vehicle, based on data that is transmitted from the crossing vehicle.

The data may be transmitted by broadcast by inter-vehicle communication, for example.

Furthermore, the data may include position information on a vehicle that is a transmission source of the data, and the controller may identify the data transmitted from the crossing vehicle, based on the position information included in the data.

Furthermore, the data may include position information on and a travel direction of a vehicle that is a transmission source of the data, and the controller may identify the data transmitted from the crossing vehicle, based on the position information and the travel direction included in the data.

By comparing the position information (and the travel direction) of a vehicle that is a transmission source of data and position information (and a travel direction) on the own vehicle, whether the vehicle that is the transmission source of the data is a vehicle whose path will cross that of the own vehicle may be determined.

Furthermore, as the predetermined process, the controller may notify a driver of the own vehicle of approach of the crossing vehicle.

According to such a configuration, one may prepare for sudden appearance or the like of the crossing vehicle.

Furthermore, in a case where signal data about a traffic signal is being received from a roadside unit that controls a traffic light and the data is received from the crossing vehicle, the controller may perform the predetermined process regardless of contents of the signal data.

In the case where the data is received from a crossing vehicle, there is a high possibility of the crossing vehicle obstructing the path of the own vehicle. Accordingly, even when signal data giving a notification of green light is being received, a process for risk avoidance is preferably performed. The possibility of collision may thereby be reduced.

A second mode of the present disclosure is a vehicle-mounted terminal (an information processing apparatus) for being mounted on a vehicle.

Specifically, there is included a controller configured to: make a call for attention toward a risk of collision to a driver of an own vehicle based on first data, transmit, to outside, second data indicating that the call for attention is made, in a case where the call for attention is made, and perform a predetermined process for risk avoidance, in a case where the second data is received from a crossing vehicle that is a vehicle whose path crosses that of the own vehicle.

In this manner, the same information processing apparatus may be mounted in both the own vehicle and the crossing vehicle.

Furthermore, the first data may be road map data indicating a spot where a momentary stop is specified.

Furthermore, the first data may be signal data, about a traffic signal, that is transmitted from a roadside unit that controls a traffic light.

Furthermore, the first data may be image data on a road sign captured by a vehicle-mounted camera.

By referring to such information pieces, a state where there is a high risk of collision may be recognized.

Furthermore, the controller may calculate a degree of risk based on the first data and a travel state of the own vehicle, and make the call for attention in a case where the degree of risk is at or greater than a predetermined value.

For example, whether to make the call for attention or not may be determined based on a probability of occurrence of traffic violation such as red light jumping or a degree of risk in the case of occurrence of traffic violation.

In the following, embodiments of the present disclosure will be described with reference to the drawings. Configurations of the embodiments below are merely examples, and the present disclosure is not limited to the configurations of the embodiments.

First Embodiment

An outline of a vehicle system according to a first embodiment will be described with reference to FIG. 1. The system according to the present embodiment includes a roadside unit 100, and a vehicle-mounted terminal 200 that is mounted on each of at least two vehicles 10.

The roadside unit 100 is an apparatus that provides information to the vehicle 10 that is traveling on a road. In the present embodiment, the roadside unit 100 also serves as a control apparatus for a traffic light installed at an intersection, and wirelessly transmits a lighting state of the traffic light to the vehicle 10 that is present in the vicinity (such as within a radius of 100 meters) of the intersection. Data that is transmitted to the vehicle 10 by the roadside unit 100 will be referred to as roadside data.

The vehicle-mounted terminal 200 is a computer that is mounted in each of the plurality of vehicles 10. The vehicle-mounted terminal 200 includes a function of determining a degree of risk based on the roadside data received from the roadside unit 100, and of outputting a warning according to the determined degree of risk. For example, in the case where the vehicle 10 is traveling toward a red light and the speed is not reduced (that is, there is a possibility of red light jumping), the vehicle-mounted terminal 200 issues a warning to the driver with a warning sound or the like.

Furthermore, in the case where the warning is output inside the vehicle, the vehicle-mounted terminal 200 notifies a vehicle in the periphery that the warning is being output.

Moreover, in the case where the notification is received from the vehicle-mounted terminal 200 mounted on another vehicle, the vehicle-mounted terminal 200 outputs, to the driver, a notification indicating that an attention should be paid to the other vehicle (for example, that the vehicle jumping the red light will possibly suddenly emerge from an intersecting road).

There is known a system according to which a roadside unit installed at an intersection transmits data about a lighting state of a traffic light by broadcast by road-to-vehicle communication, and a vehicle receiving the same provides assistance to the driver (by outputting a warning, for example). However, this system does not take into consideration a case where the driver of the vehicle receiving the roadside data does not follow instructions.

With the vehicle system according to the embodiment, to cope with such a situation, in a case where there is a vehicle in which a warning is being issued based on the roadside data, this vehicle notifies another vehicle in the vicinity of the same. Furthermore, when the notification is received, the other vehicle makes a call for attention toward "presence of a vehicle nearby that is issuing a warning". Accordingly, even in a case where there is a vehicle that is about to enter an intersection without noticing the red light, vehicles in the periphery may be given a notification of the same.

In the following description, an example will be described where two vehicles 10 are traveling toward one intersection with traffic lights. That is, the two vehicles are vehicles whose paths cross each other. In the embodiment, the vehicle 10 on the red light side (the vehicle that should stop) will be referred to as a vehicle 10A or a first vehicle 10A, and the vehicle 10 on the green light side (the vehicle with the right of way) will be referred to as a vehicle 10B or a second vehicle 10B. In the present embodiment, the same vehicle-mounted terminal 200 is mounted on both the first vehicle 10A and the second vehicle 10B.

In the description of the embodiment, the first vehicle 10A outputs a warning based on the roadside data received from the roadside unit 100, and the second vehicle 10B receives a notification indicating "there is a vehicle (the vehicle 10A) nearby that is outputting a warning".

Structural elements of the system will be described in detail.

The roadside unit 100 may be a general-purpose computer. That is, the roadside unit 100 may be a computer including processors such as a CPU and a GPU, main memories such as a RAM and a ROM, and an auxiliary memory such as an EPROM, a hard disk drive and a removable medium. The auxiliary memory stores an operating system (OS), various programs, various tables and the like, and each function matching a predetermined purpose as described below may be implemented by executing the program stored in the auxiliary memory. However, the functions may be partly or wholly implemented by a hardware circuit such as an ASIC or an FPGA.

Figure 2:
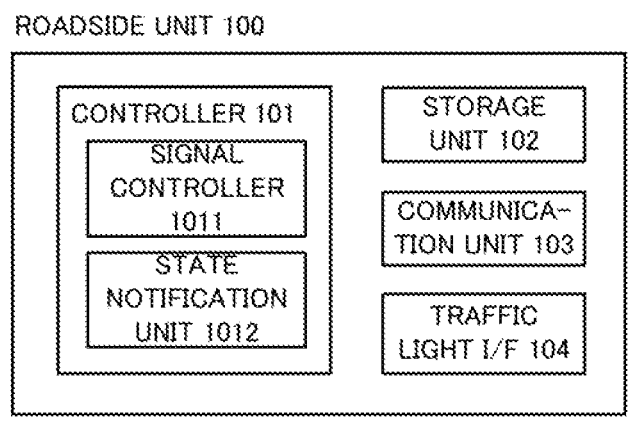
FIG. 2 is a block diagram schematically illustrating an example of a roadside unit.

FIG. 2 is a block diagram schematically illustrating an example configuration of the roadside unit 100 illustrated in FIG. 1. The roadside unit 100 includes a controller 101, a storage unit 102, a communication unit 103, and a traffic light interface 104.

The controller 101 is a unit configured to control the roadside unit 100. The controller 101 is implemented by a CPU, for example.

The controller 101 includes, as functional modules, a signal controller 1011 and a state notification unit 1012. Each functional module may be implemented by the CPU executing a program stored in storage unit such as a ROM.

The signal controller 1011 controls lighting of a traffic light, and more specifically, calculates a signal cycle and outputs an instruction to switch lighting at a predetermined cycle. Control of lighting may be performed via the traffic light interface 104 described later.

Figure 3:
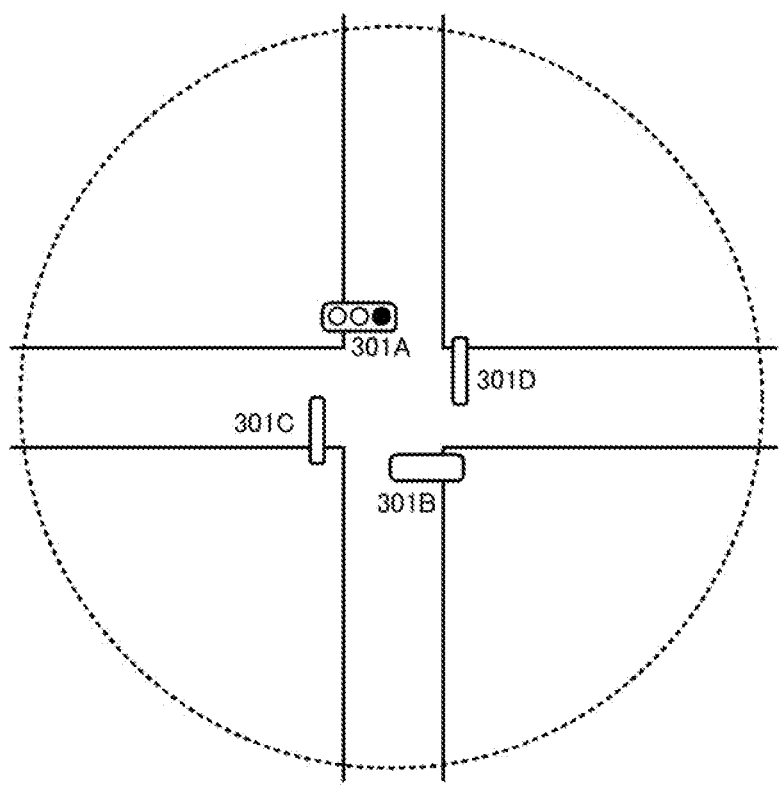
FIG. 3 is a schematic diagram illustrating an example of an intersection that is managed by the system.

FIG. 3 is a sketch illustrating an example of an intersection where traffic lights corresponding to the roadside unit 100 are installed. In the present embodiment, to control a traffic flow in an up-down direction and a traffic flow in a left-right direction, the signal controller 1011 controls each pair of traffic lights 301A and 302B, and traffic lights 301C and 302D.

The state notification unit 1012 generates data (roadside data) for notifying the vehicle 10 of a lighting state of a traffic light, and transmits the same by broadcast through wireless signals. A region surrounded by a dotted line in FIG. 3 indicates a reachable range of the wireless signals.

FIG. 4 is an example of the roadside data that is transmitted from the roadside unit 100 corresponding to the intersection illustrated in FIG. 3. The roadside data includes information pieces such as an identifier of the intersection (and the roadside unit 100), position information on the intersection, identifiers of a plurality of traffic lights, a bearing of a road connected to each traffic light, information about cycles of traffic lights, current lighting states, and remaining times until the states change.

By transmitting these information pieces, the roadside unit 100 may notify the vehicle-mounted terminal 200 of the state of a traffic light (or a timing of change of the traffic light).

Additionally, in the present example, the bearing of connection of a road is expressed in number, but data (map information) indicating a connection relationship of a road may alternatively be included in the roadside data.

The storage unit 102 is a unit configure to store information, and is a storage medium such as a RAM, a magnetic disk, a flash memory or the like. The storage unit 102 stores various programs to be executed by the controller 101, data to be used by the programs, and the like. The storage unit 102 further stores data for controlling the traffic light described above (data about a signal cycle or a timetable, for example).

The communication unit 103 is an interface for wirelessly performing road-to-vehicle communication with the vehicle-mounted terminal 200. For example, the communication unit 103 performs DSRC communication with the vehicle-mounted terminal 200 using radio waves in the 5.8 GHz band.

The traffic light interface 104 is an interface unit that connects the roadside unit 100 and a plurality of traffic lights (for example, 301A to 301D). The controller 101 is capable of switching the lighting states of a plurality of traffic lights by transmitting a command to the traffic light interface 104.

Figure 5:
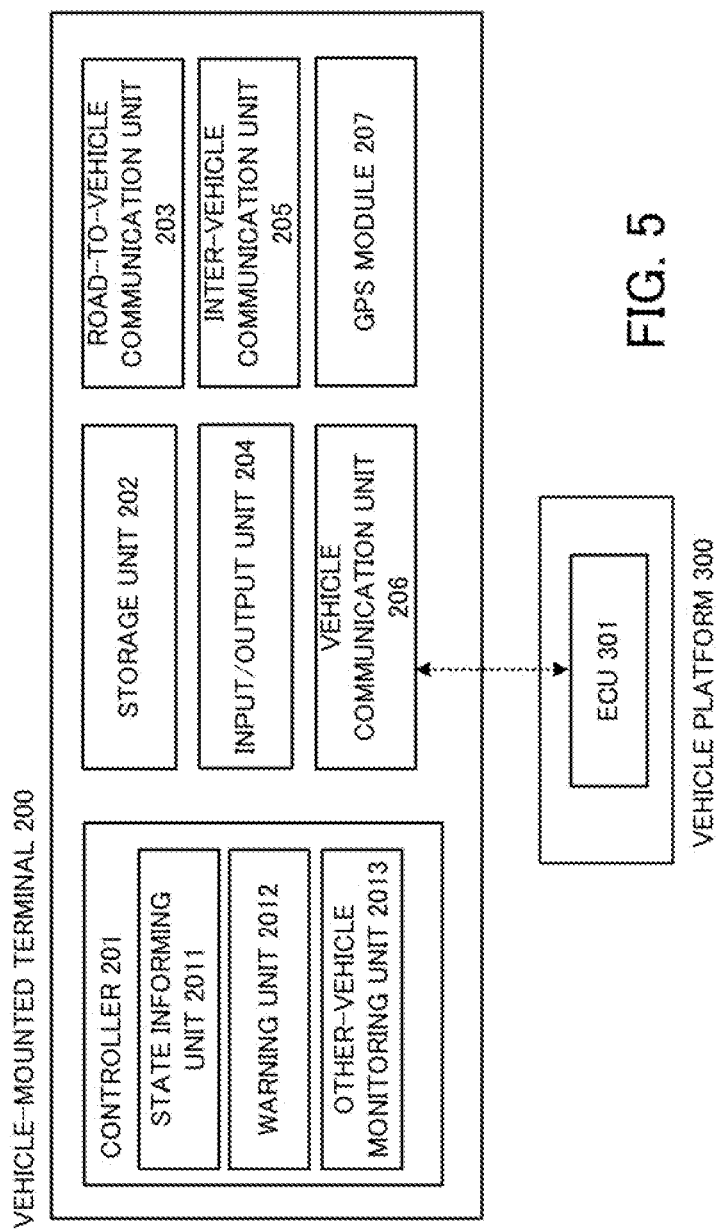
FIG. 5 is a block diagram schematically illustrating an example of a vehicle-mounted terminal.

Next, a description of the vehicle-mounted terminal 200 will be given with reference to FIG. 5.

The vehicle-mounted terminal 200 is a small computer that is mounted in the vehicle 10. The vehicle-mounted terminal 200 includes a controller 201, a storage unit 202, a road-to-vehicle communication unit 203, an input/output unit 204, an inter-vehicle communication unit 205, a vehicle communication unit 206, and a GPS module 207.

The controller 201 is a unit configure to control the vehicle-mounted terminal 200. The controller 201 is a microcomputer, for example. The controller 201 may execute programs stored in the storage unit 202 described later by a CPU to implement functions thereof.

The controller 201 includes, as functional modules, a state informing unit 2011, a warning unit 2012, and an other-vehicle monitoring unit 2013. Each functional module may be implemented by the CPU executing a program stored in storage unit (such as a ROM).

The state informing unit 2011 acquires data (hereinafter "vehicle data") about traveling of the own vehicle, and wirelessly transmits the vehicle data by broadcast via the inter-vehicle communication unit 205 described later. For example, information about traveling of the own vehicle may include, but not limited to, an identifier, position information, a travel direction, a speed and the like of the vehicle. FIG. 6 illustrates an example of the vehicle data. A description of a warning flag will be given later.

The position information on and the travel direction of the own vehicle may be acquired from the GPS module 207 described later. Furthermore, the speed of the own vehicle may be acquired from a vehicle platform 300 described later.

The vehicle data is transmitted every predetermined period of time (such as every 100 milliseconds). The vehicle data that is transmitted is used by other vehicles for safe traffic. Pieces of the vehicle data that are transmitted by a plurality of vehicles by broadcast to be received and used by other vehicles may be used for prevention of head-on collisions, minor accidents and the like, for example.

The warning unit 2012 outputs a warning to the driver based on the roadside data received from the roadside unit 100. Specifically, a warning is issued to the driver in a case where (1) a positional relationship between the traffic light associated with the roadside unit 100 and the own vehicle is determined, and (2) the speed is such that the vehicle cannot be safely stopped before a predetermined stop position even though there is a red light ahead in the travel direction. Additionally, in the present example, the warning is output in a case where it is estimated that a red light is not being noticed by the driver, but a precautionary warning may be output instead to prevent overlooking of the red light. Furthermore, the warning may be output at a plurality of levels depending on the degree of risk.

The warning unit 2012 sets a flag (a warning flag; reference sign 601) for giving a notification of output/non-output of a warning, in the vehicle data generated by the state informing unit 2011. A true value (1) is set for the warning flag in a period when the warning is output, and a false value (0) is set in a period when the warning is not output. Additionally, in the case where there is a plurality of levels of warning, the warning flag may be set at any of the levels. The vehicle data in which the true value is set for the warning flag corresponds to "second data" in the present disclosure.

That the warning flag included in the vehicle data takes the true value means that a warning urging deceleration or stop is being output inside a cabin of the vehicle transmitting the vehicle data. A vehicle transmitting such vehicle data possibly impairs traffic safety by ignoring the red light and entering the intersection or by entering a road with the right of way without temporarily stopping, for example.

By transmitting the vehicle data including the warning flag by broadcast, a call for attention may be made to vehicles in the periphery to giving a notification of approach of a vehicle that will possibly impair traffic safety, for example.

The other-vehicle monitoring unit 2013 makes a call for attention to the driver based on the warning flag included in the vehicle data received from another vehicle. Specifically, in the case where the vehicle data is received from another vehicle, a positional relationship between the vehicle and the own vehicle is determined, and in the case where the warning flag is set in the vehicle data that is transmitted from the vehicle whose path crosses that of the own vehicle, a notification indicating that "attention should be paid to the other vehicle" is output.

The storage unit 202 is a unit configure to store information, and is a storage medium such as a RAM, a magnetic disk, a flash memory or the like. The storage unit 202 stores various programs to be executed by the controller 201, data and the like.

The road-to-vehicle communication unit 203 is a communication unit configure to perform wireless communication with the roadside unit 100. The road-to-vehicle communication unit 203 performs wireless communication by the same unit as the communication unit 103.

The input/output unit 204 is a unit configure to receive an input operation performed by a user, and to present information to the user, and includes, specifically, a touch panel and control unit thereof, or a liquid crystal display and control unit thereof. In the present embodiment, the touch panel and the liquid crystal display are one touch panel display. Furthermore, the input/output unit 204 may include a speaker for outputting sound, for example.

The inter-vehicle communication unit 205 is an interface for performing wireless communication with the vehicle-mounted terminal 200 mounted on another vehicle. For example, the inter-vehicle communication unit 205 performs DSRC communication with the vehicle-mounted terminal 200 mounted on another vehicle using radio waves in the 5.8 GHz band.

The vehicle communication unit 206 is an interface unit that performs communication with the vehicle platform 300. The vehicle communication unit 206 is capable of communicating with an ECU 301 of the vehicle platform 300 via an in-vehicle network.

The GPS module 207 is a module that receives radio waves transmitted from satellites to calculate the position information.

The vehicle platform 300 is a platform including a computer that controls the vehicle 10. For example, the vehicle platform 300 includes at least one computer (ECU 301) for controlling the vehicle, such as an engine ECU, a body ECU, and an autonomous driving ECU.

Next, details of processes performed by each structural element included in the system will be given.

Figure 7:
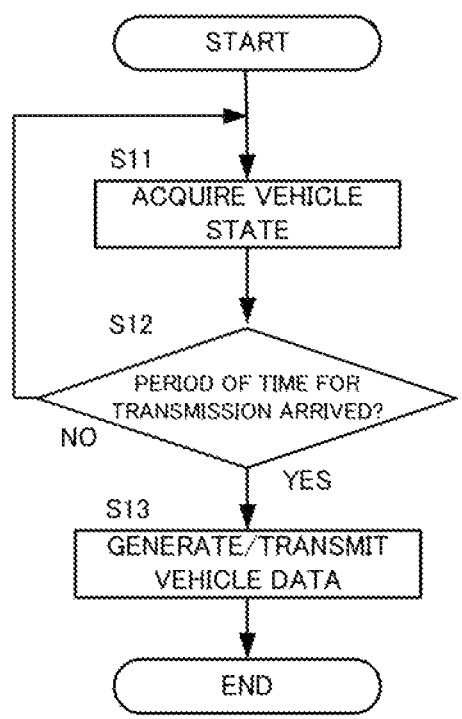
FIG. 7 is a flowchart of a process that is performed by the vehicle-mounted terminal in a first embodiment.

FIG. 7 is a flowchart illustrating a process that is performed by the vehicle-mounted terminal 200 to transmit the vehicle data by broadcast. The process illustrated in the drawing is performed by the controller 201 (the state informing unit 2011) every predetermined period of time.

First, in step S11, communication with the vehicle platform 300 is performed via the vehicle communication unit 206, and data about the state of the vehicle is acquired. As the data, the position information, the travel direction, the speed and the like may be cited, for example.

Next, in step S12, whether a period of time when the vehicle data is to be transmitted arrived or not is determined. The period of time when the vehicle data is to be transmitted may be every 100 milliseconds, for example. In the case where it is not yet the period of time, the process returns to an initial state. In the case where the period of time arrived, the process proceeds to step S13, and vehicle data including the acquired data is generated and transmitted by broadcast via the inter-vehicle communication unit 205.

Figure 8:
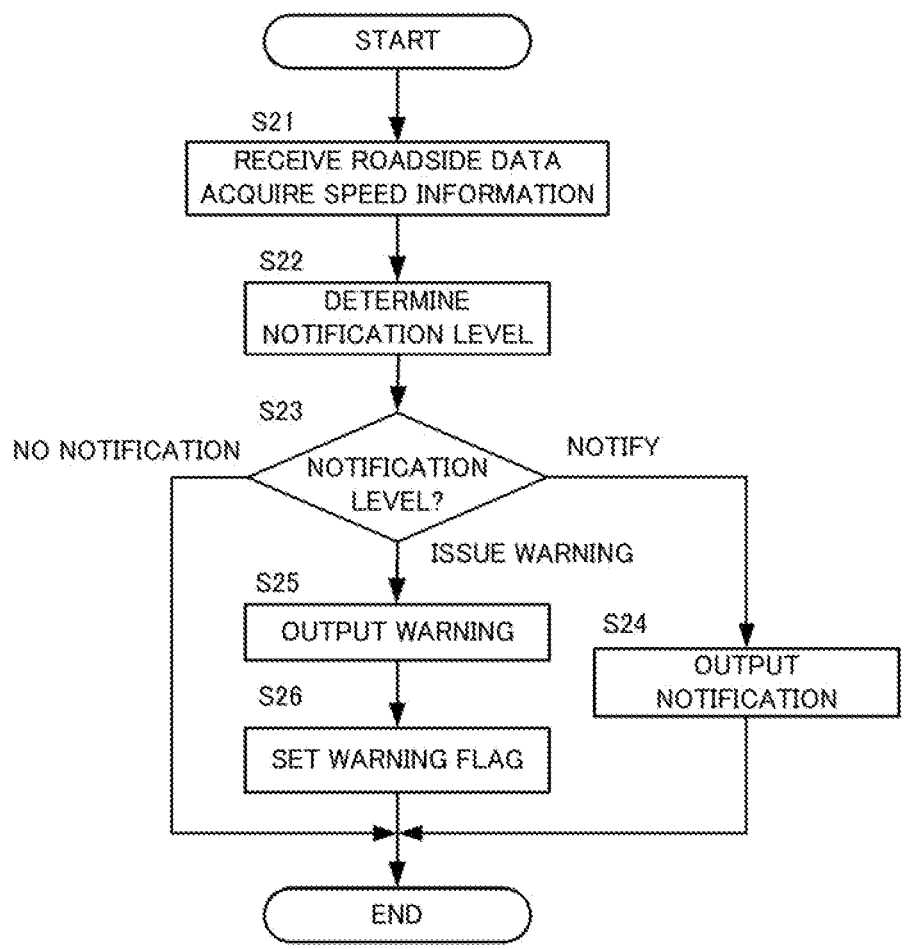
FIG. 8 is a flowchart of a process that is performed by the vehicle-mounted terminal in the first embodiment.

FIG. 8 is a flowchart of a process that is performed by the vehicle-mounted terminal 200 to receive the roadside data from the roadside unit 100, and to issue a warning based on the received roadside data. The process illustrated in the drawing is performed by the controller 201 (the warning unit 2012) every predetermined period of time.

First, in step S21, the roadside data is received from the roadside unit 100 via the road-to-vehicle communication unit 203. Furthermore, speed information on the own vehicle is acquired via the vehicle platform 300.

Next, in step S22, a notification level is determined based on the received roadside data. The notification level is a value expressing a level of intensity with which a notification about a red light is to be issued, and includes three levels of "no notification", "notify", and "issue warning".

Figure 9:
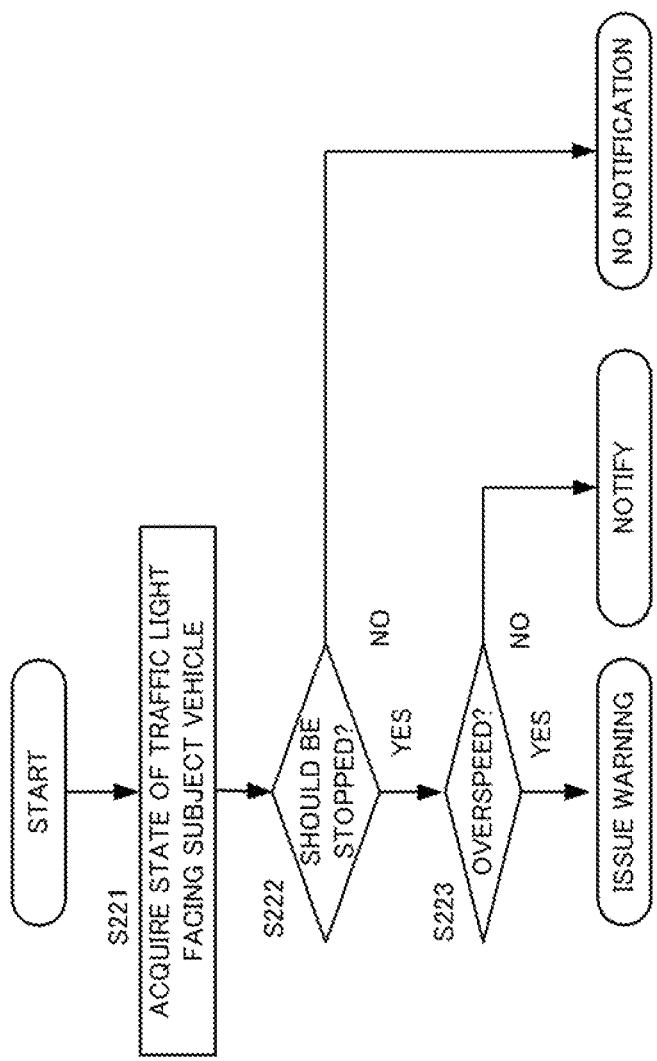
FIG. 9 is a flowchart illustrating a process in step S22.

FIG. 9 is a flowchart illustrating the process in step S22 in detail.

First, in step S221, the state of the traffic light facing the own vehicle is acquired based on the roadside data. For example, in the example in FIG. 3, the own vehicle is assumed to be traveling in a direction toward the traffic light 301A. That is, the bearing of the travel direction is 0 degrees. Here, the vehicle-mounted terminal 200 is assumed to receive the roadside data illustrated in FIG. 4. In the case of the example illustrated in the drawing, the ID of the traffic light corresponding to the travel direction of the own vehicle is "S001", and the current state is "green". By contrast, in the case where the own vehicle is traveling in a direction toward the traffic light 301C, the bearing of the travel direction is 90 degrees, and the current state of the corresponding traffic light is "red".

Additionally, in the present example, the traffic light that faces the own vehicle is identified based on the travel direction of the vehicle, but in the case where the roadside data includes map information, the traffic light that faces the own vehicle may be identified based on the map information.

Next, in step S222, whether the own vehicle should stop or not is determined. In the present step, a positive determination is made in the case where it is predicted that the traffic light will turn red before the own vehicle reaches a predetermined stop position (a stop line). Additionally, the predetermined stop position may be determined based on the position information included in the roadside data. Furthermore, a timing of change to the red light may be determined based on "remaining time" included in the roadside data. In the case where it is predicted that the traffic light will not turn red before the own vehicle reaches the stop position, a negative determination is made in the present step.

In the case where a positive determination is made in step S222, the process proceeds to step S223.

In the case where a negative determination is made in step S222, the notification level is "no notification".

Figure 10:
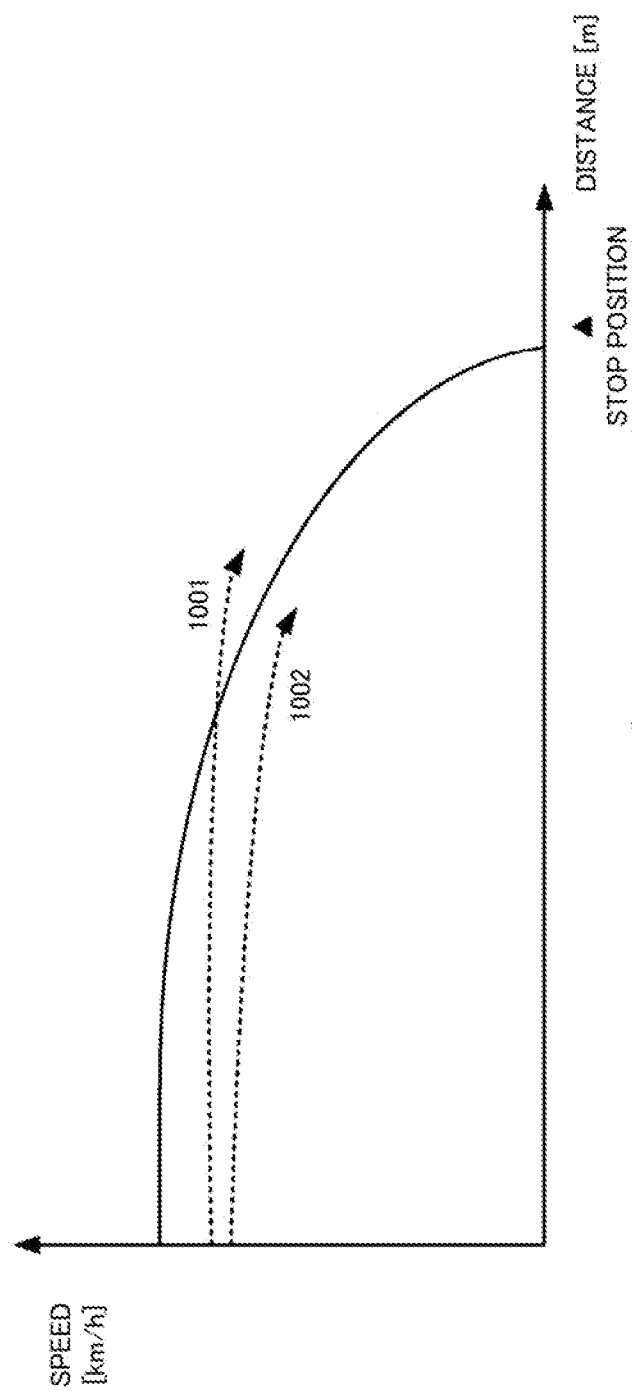
FIG. 10 is a diagram illustrating a speed pattern of deceleration.

In step S223, whether the speed of the own vehicle is exceeding a specified speed or not is determined. The specified speed may be defined by data (a speed pattern) indicating a relationship between a remaining distance to the stop position and the speed, as illustrated in FIG. 10. For example, the speed pattern illustrated in the drawing indicates a speed at which one may easily stop before a specified stop position.

That the speed of the own vehicle exceeds the speed indicated by such a pattern means that one cannot easily stop before a specified stop position. For example, in the case where, as indicated by a reference sign 1001, the speed of the own vehicle exceeds the speed indicated by the pattern, a positive determination is made in step S223. Furthermore, for example, in the case where, as indicated by a reference sign 1002, the speed of the own vehicle does not exceed the speed indicated by the pattern, a negative determination is made in step S223.

Additionally, in the present example, the determination described above is performed based on the speed of the vehicle, but different information may also be used as long as a risk of red light jumping can be determined. For example, that the brake pedal of the vehicle is not stepped on or that the accelerator pedal is stepped on may be determined, and a positive determination may be made in step S223 in the case where there is no sign of deceleration.

Furthermore, in the case where information about the state of the driver can be acquired, a risk of red light jumping may be determined based on the information. For example, in the case where the vehicle platform 300 includes a sensor for detecting a line of sight of the driver, a positive determination may be made in step S223 in the case where the line of sight of the driver is determined to be not in the direction of the traffic light.

Figure 11A:
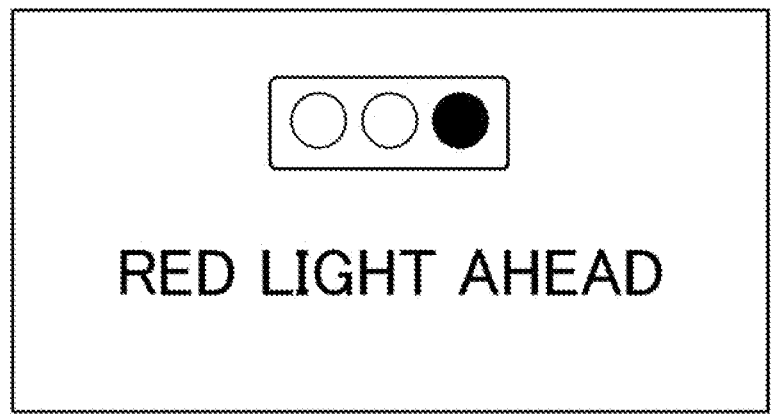
FIGS. 11A to 11C are examples of an image that is presented to a driver.

In the case where a negative determination is made in step S223, the notification level is "notify". In this case, the process proceeds to step S24, and a process of notifying the driver of the vehicle of presence of the red light is performed. For example, the notification may be performed by being output as an image as illustrated in FIG. 11A, or may be output as a sound of a chime or the like, or the two may be used in combination.

Figure 11B:
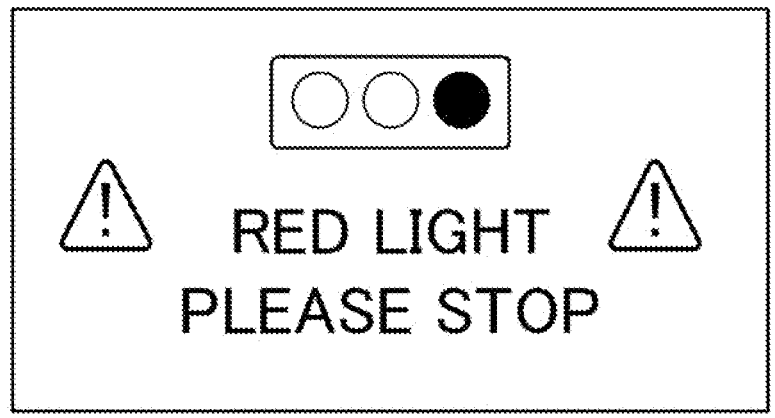

In the case where a positive determination is made in step S223, the notification level is "issue warning". In this case, the process proceeds to step S25, and a warning is output to the driver of the vehicle. For example, the notification may be performed by being output as an image as illustrated in FIG. 11B, or may be output as a warning sound, or the two may be used in combination.

Additionally, in the present example, whether to output a warning or not is determined in step S22, but instead, a plurality of levels may be set in relation to the warning, and the warning may be output by a method according to the level. For example, the level of the warning may be determined according to the degree of risk. For example, the greater the deceleration needed to stop at a specified stop position, the greater the risk is determined to be, and the warning at a higher level may be issued.

In the case where the warning is output in step S25, the warning flag included in the vehicle data is set to the true value in step S26. The vehicle data including the warning flag is transmitted by broadcast in the next period of time for transmission. Additionally, in the case where the process in step S26 is not performed, the warning flag included in the vehicle data remains the false value.

Figure 12:
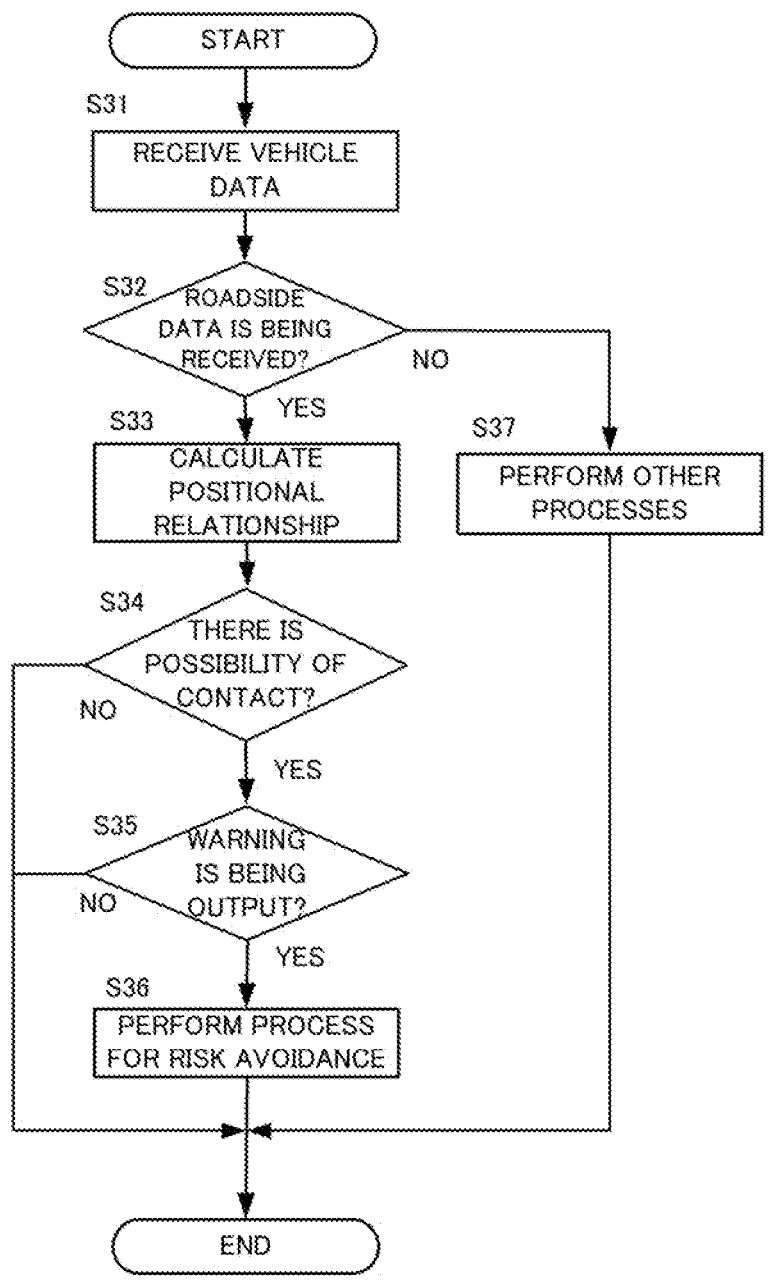
FIG. 12 is a flowchart of a process that is performed by the vehicle-mounted terminal in the first embodiment.

FIG. 12 is a flowchart illustrating a process that is performed by the vehicle-mounted terminal 200 at the time of reception of the vehicle data. The process illustrated in the drawing is performed by the controller 201 (the other-vehicle monitoring unit 2013) every predetermined period of time.

First, in step S31, vehicle data that is transmitted by broadcast from another vehicle is received.

Next, in step S32, whether the own vehicle is in a range where the roadside data from the roadside unit 100 can be received is determined. For example, in the case where the roadside data is received from the roadside unit 100 by the warning unit 2012 in an immediately preceding predetermined period of time (for example, 500 milliseconds), a positive determination is made in the present step.

In the case where a negative determination is made in the present step, the process proceeds to step S37. A negative determination in step S32 means that the own vehicle is not in the vicinity of an intersection with a traffic light. In this case, in step S37, a known process regarding safety is performed based on vehicle data exchanged between vehicles. For example, a known process regarding safety may be a process for avoiding head-on collision at an intersection with no traffic light or for avoiding contact at the time of changing lanes.

That a positive determination is made in step S32 means that the own vehicle is in the vicinity of an intersection with a traffic light. In this case, a known process regarding safety that uses inter-vehicle communication is not performed, and instead, two processes are performed, namely, (1) a process, as illustrated in FIG. 8, of giving a notification of presence of a red light based on the roadside data, and (2) a process of giving a notification of presence of a vehicle that is highly likely to jump the red light.

The above-mentioned (1) is periodically performed by the warning unit 2012. The above-mentioned (2) will be described below (steps S33 to S36).

In step S33, a positional relationship between a vehicle transmitting the vehicle data (hereinafter "target vehicle") and the own vehicle is calculated. Specifically, the position information and the travel direction included in the vehicle data and the position information and the travel direction acquired by the vehicle-mounted terminal 200 or the vehicle platform 300 are acquired, and a relative positional relationship between the vehicles is acquired.

Here, in the case where a relative distance between the vehicles is at or smaller than a predetermined value (for example, 50 meters or less) and estimated paths of the vehicles cross each other, the target vehicle and the own vehicle are determined to possibly collide into or contact each other.

Figure 13A:
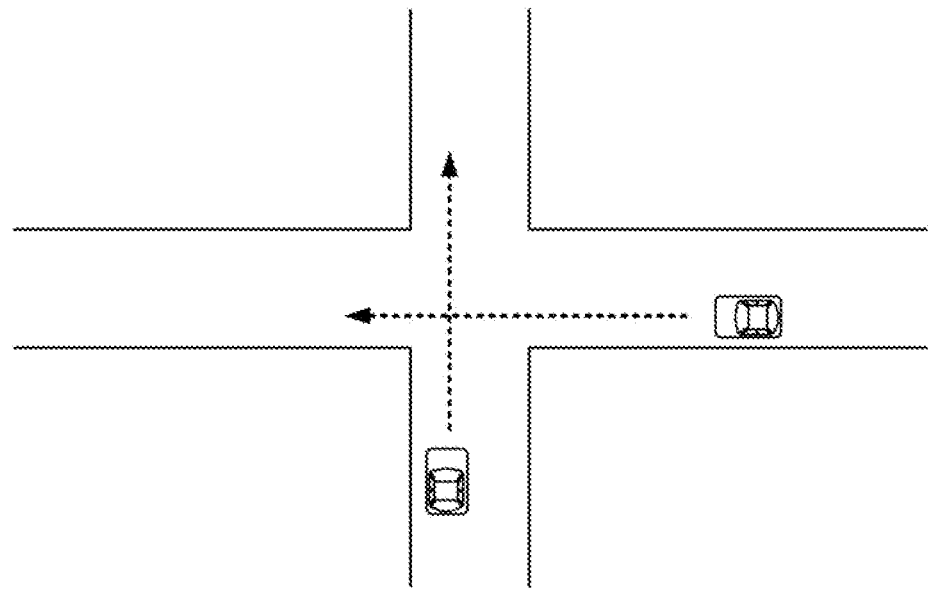
FIGS. 13A and 13B are diagrams describing crossing of paths of vehicles.

Dotted lines in FIG. 13A indicate estimated paths of the vehicles. The path of a vehicle can be estimated based on the travel direction of the vehicle, for example. The travel direction of the own vehicle can be acquired from the vehicle platform 300. Furthermore, the travel direction of the other vehicle can be acquired by referring to the vehicle data that is received.

Figure 13B:
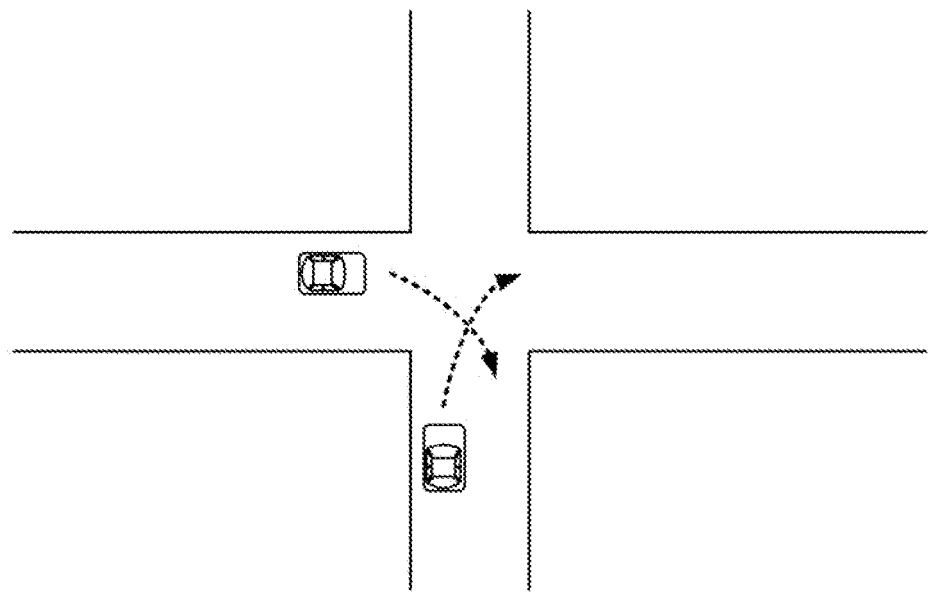

Additionally, in the case where data about an operation state of a steering wheel (a steering angle of the vehicle) or an operation state of an indicator can be used, the path of the vehicle may be estimated using such data. FIG. 13B is a diagram illustrating paths that are estimated using steering angles of the vehicles.

In the case where it is determined that the target vehicle and the own vehicle will possibly collide into or contact each other (step S34: Yes), the process proceeds to step S35. In other cases (step S34: No), the process is ended.

In step S35, whether a warning is being output in the target vehicle is determined. In the case where a warning is being output (that is, in the case where the true value is set for the warning flag included in the vehicle data), the process proceeds to step S36.

In the case where a warning is not being output (that is, in the case where the false value is set for the warning flag included in the vehicle data), the process is ended. This is because, in the case where a warning is not output in the target vehicle, the vehicle can be estimated to be decelerating or stopping according to the red light.

In step S36, a process for risk avoidance is performed at the own vehicle. In the case where a warning is being output in the target vehicle, this vehicle can be said to be in a state where the vehicle will possibly contact or collide into the own vehicle (by entering the intersection on red light, for example).

Figure 11C:
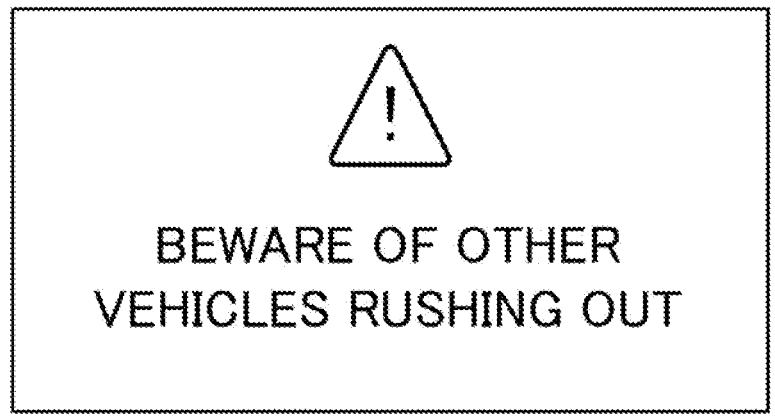

Accordingly, in the present step, a notification indicating that one has to beware of presence of a vehicle that is moving forward by jumping the red light is generated and output. For example, the warning may be output as an image as illustrated in FIG. 11C, or may be output as a warning sound, or the two may be used in combination.

Furthermore, other processes for supporting risk avoidance may be performed. For example, in the case where the own vehicle includes a function of assisting braking, brake may be automatically applied or a preliminary operation therefor may be performed.

Furthermore, in step S36, the driver may be given a notification of the position of the target vehicle. For example, in the case where the vehicle includes an interface device such as a head-up display or a head-mounted display, the position or direction in which the target vehicle exists may be presented to the driver of the own vehicle via the interface device. In particular, in the case where an augmented reality (AR) display device (such as a head-mounted display) is mounted in the vehicle, the position or direction in which the target vehicle exists may be intuitively transmitted to the driver.

Figure 14:
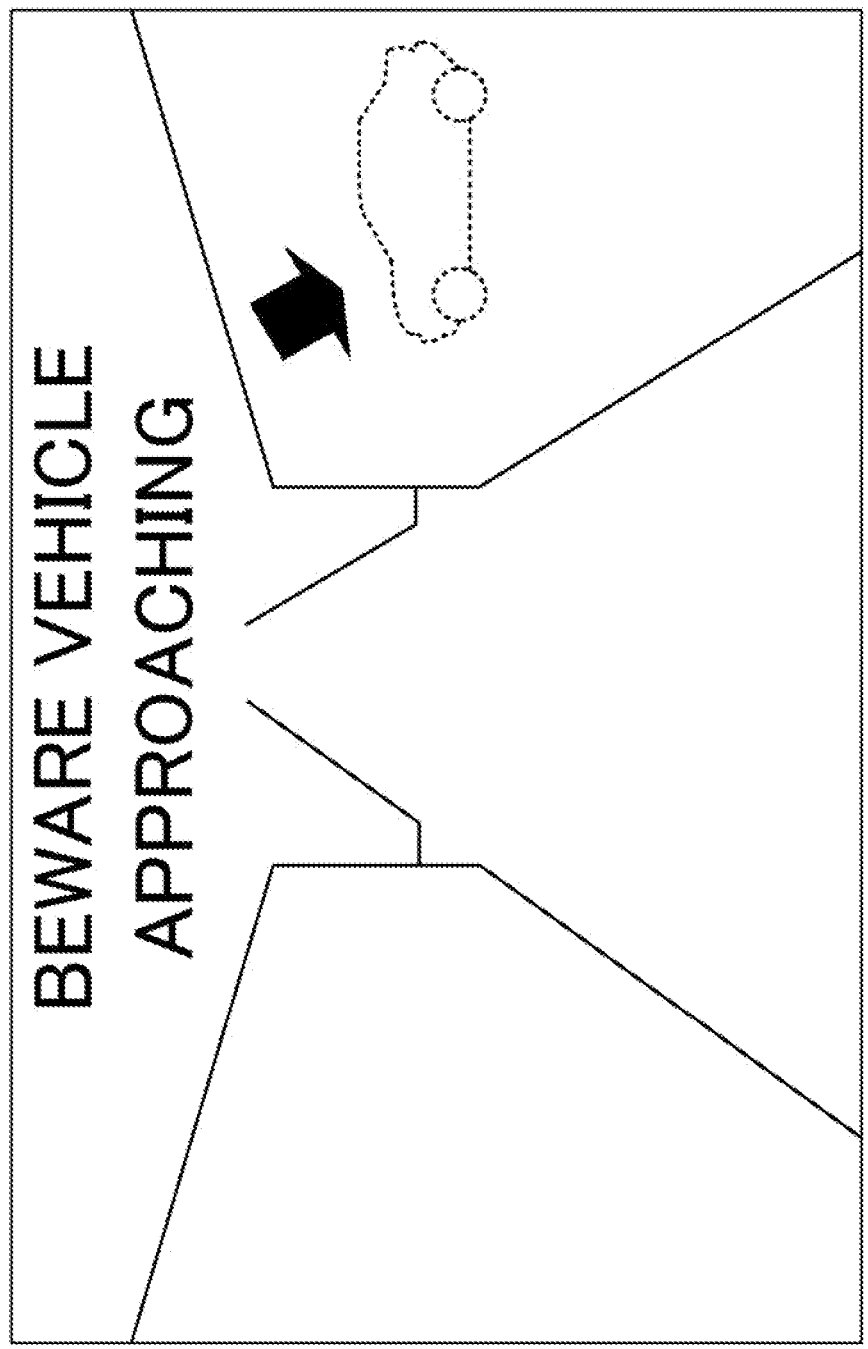
FIG. 14 is another example of the image that is presented to the driver.

FIG. 14 is an example of a screen that is output on the AR display device (for example, a head-mounted display) mounted in the vehicle. As illustrated in the drawing, a graphic indicating the position of the target vehicle in such a way as to allow the driver to view the position of the target vehicle through the AR display device may be generated and output to the AR display device.

Additionally, the present step is performed also in a case where the roadside data indicating that there is no problem with the own vehicle proceeding (for example, there is a green light ahead) is received from the roadside unit 100 by the warning unit 2012.

As described above, the vehicle-mounted terminal 200 according to the first embodiment ensures safety at an intersection by road-to-vehicle communication, and also, in the case where a warning is output based on the road-to-vehicle communication, the vehicle-mounted terminal 200 notifies vehicles in the periphery to the effect by inter-vehicle communication.

At an intersection where data about traffic signals is transmitted by the roadside unit, accidents may be prevented by performing road-to-vehicle communication. However, with such a mode, an accident caused by a vehicle not following the traffic light cannot be prevented. On the other hand, in the case where only inter-vehicle communication is used, there is a problem that a warning is issued even in a case where the other vehicle is starting to decelerate, for example.

With the vehicle system according to the present embodiment, by using road-to-vehicle communication and inter-vehicle communication in combination, shortcomings of the two may be overcome, and travel safety of vehicles can be increased.

Second Embodiment

In the first embodiment, the vehicle-mounted terminal 200 outputs a notification to the driver of the own vehicle to the effect that one should beware of presence of other vehicles. By contrast, a second embodiment is an embodiment in which the vehicle-mounted terminal 200 causes the own vehicle that is traveling on cruise control to autonomously decelerate.

In the second embodiment, the vehicle platform 300 further includes an ECU for performing cruise control. The ECU at least provides a function of autonomously controlling speed.

In the case where the cruise control function is valid, the vehicle 10 autonomously controls the speed so as to maintain the speed of the own vehicle at a predetermined value or to prevent an inter-vehicle distance from falling below a predetermined value by detecting a preceding vehicle by inter-vehicle communication, a camera, a millimeter wave radar or the like.

In the second embodiment, in the case where a warning is being output in the first vehicle 10A, the second vehicle 10B is caused to decelerate in step S35. For example, the vehicle is caused to temporarily decelerate, by making a target set value of cruising speed small.

In this manner, according to the second embodiment, it is possible to prepare for approach of a vehicle that will possibly jump the red light, even in a case where traveling is performed using the cruise control function.

Third Embodiment

In the description of the first and second embodiments, an example is given where the roadside unit 100 provides data to the vehicle-mounted terminal 200, but the apparatus for providing data does not necessarily have to be the roadside unit 100. A third embodiment is an embodiment in which the vehicle-mounted terminal 200 (the warning unit 2012) outputs a warning based on other than the roadside data.

In the third embodiment, the warning unit 2012 acquires, instead of the roadside data, data (state data) for determining whether the vehicle is in a state where the vehicle should be stopped, and determines that the own vehicle is in a state where the own vehicle should decelerate or stop, based on the state data.

Examples of the state data are as follows.
(1) Road Map Data and Position Information For example, road map data may be stored in the vehicle-mounted terminal 200 (the storage unit 202), and a spot where the vehicle should temporarily stop may be specified based on the road map data and the position information on the own vehicle. For example, as the spot where the vehicle should temporarily stop, a spot where there is a stop sign, a spot where a road with no right of way merges with a road with the right of way, a spot between a facility or the like beside a road and the road, and the like may be cited.
(2) Image Data Acquired from Vehicle-Mounted Camera For example, in the case where the vehicle platform 300 includes a vehicle-mounted camera, presence of a red light, a stop sign or the like may be determined by analyzing an image acquired from the vehicle-mounted camera.

In the third embodiment, that the own vehicle is in a state where a stop should be made is determined based on a result of determination performed based on the state data, and a warning is output in a case where the own vehicle is moving on without stopping even in a state where a stop should be made.

Figure 15:
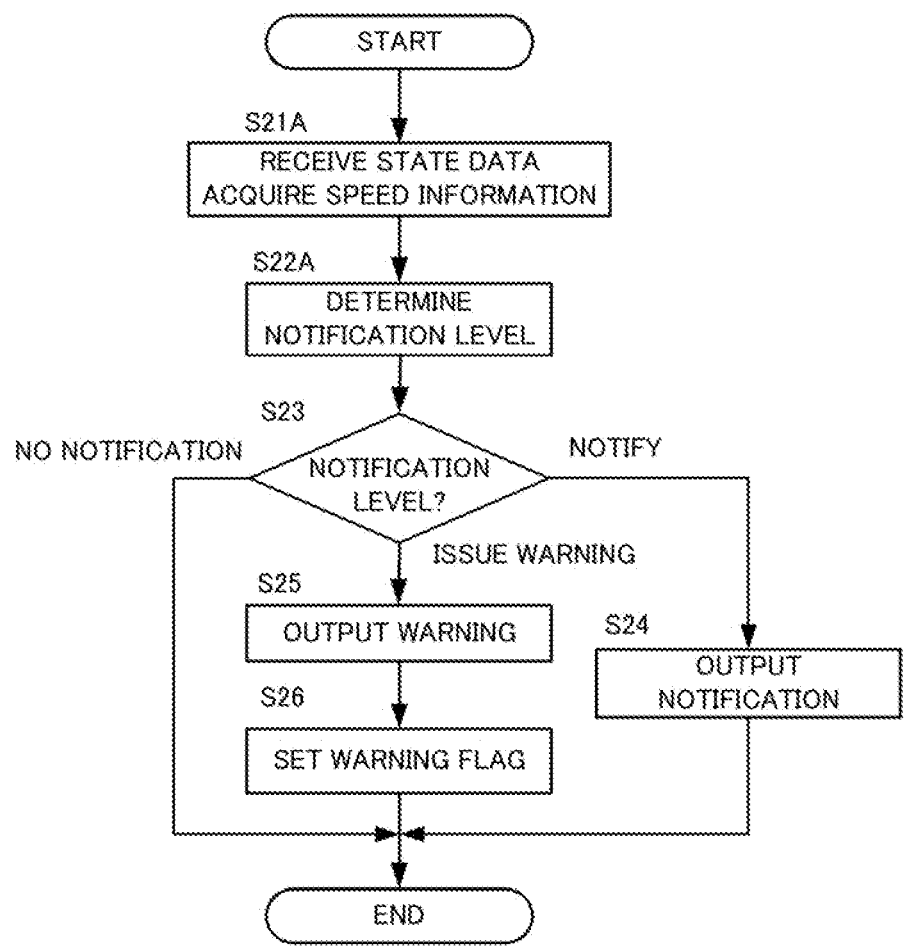
FIG. 15 is a flowchart of a process that is performed by the vehicle-mounted terminal in a third embodiment.

FIG. 15 is a flowchart illustrating a process that is performed by the vehicle-mounted terminal 200 (the warning unit 2012) in the third embodiment to issue a warning.

In the present embodiment, in step S21A, the state data is acquired. As described above, the state data may be an image that is acquired by the vehicle-mounted camera or the road map data that is stored in advance, or may be position information that is acquired by a GPS module or a combination thereof.

Furthermore, in step S22A, the notification level is determined based on the state data and the speed information. In the present step, whether the vehicle can be stopped before a predetermined stop position is determined based on acquired sensor data, and the notification level is determined in the same manner as in the first embodiment (according to necessary deceleration, for example). Additionally, at this time, the road map data and the like may be referred to.

Processes from step S23 are the same as those in the first embodiment.

Figure 16:
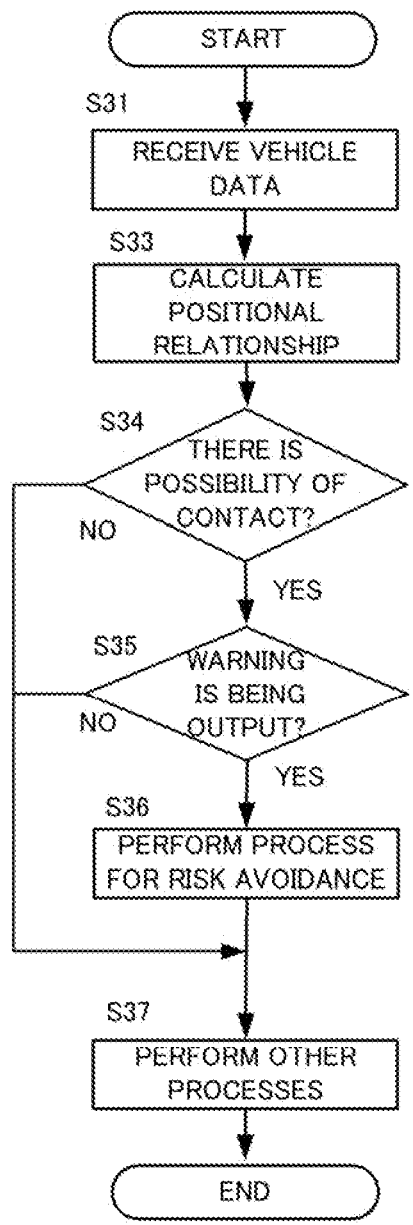
FIG. 16 is a flowchart of a process that is performed by the vehicle-mounted terminal in the third embodiment.

FIG. 16 is a flowchart illustrating a process that is performed by the vehicle-mounted terminal 200 (the other-vehicle monitoring unit 2013) in the third embodiment, at a time of reception of the vehicle data.

In the present embodiment, the roadside unit 100 does not transmit the roadside data, and thus, determination in step S32 is not performed, and processes in steps S33 to S36 and a process in step S37 are sequentially performed.

A risk of contact or the like may be given a notification of by inter-vehicle communication even when using only processes of conventional technologies (the process in step S37). However, in the third embodiment, because the processes in steps S33 to S36 are used in combination, a more intense warning may be issued in a risky situation.

(Modifications)

The embodiments described above are merely examples, and the present disclosure may be changed as appropriate within the scope of the disclosure.

For example, processes and units described in the present disclosure may be freely combined to the extent that no technical conflict exists.

Furthermore, in the description of the embodiments, whether to output a warning or not is determined based on "whether the first vehicle 10A can be stopped before a predetermined stop position or not", but whether to output a warning or not may be determined based on necessity to stop, and other than the speed of the vehicle.

For example, a warning may be output to the first vehicle 10A in the case where the attention of the driver of the first vehicle 10A is not directed to crossing traffic at a position where roads cross each other or merge into each other. That is, a warning may be output in the case where the driver of the first vehicle 10A is taking an action that may impair safety of surrounding traffic. The vehicle-mounted terminal 200 may further include a function therefor (for example, a function of sensing the driver).

Furthermore, in the description of the embodiments, data about the lighting state of the traffic light is transmitted as the roadside data, but the roadside data may be for giving a notification of other information pieces. For example, presence of a stop sign, presence of a railroad crossing, presence of an oncoming vehicle or an obstacle, and the like may be given a notification of.

Furthermore, in the description of the embodiments, an example is cited where the vehicle data is transmitted by inter-vehicle communication, but the transmission method of the data is not limited to inter-vehicle communication as long as presence of a vehicle in which a warning is being output can be transmitted to vehicles in the periphery. For example, in the case where a warning is being output in a vehicle, a center server may transmit corresponding vehicle data to other vehicles that are in the vicinity of the target vehicle.

Furthermore, in the description of the embodiments, an example is cited where the same vehicle-mounted terminal 200 is mounted in the first vehicle 10A and the second vehicle 10B, but different terminals may be mounted in the vehicles. In this case, it suffices if the terminal mounted in the first vehicle 10A includes the functions of the state informing unit 2011 and the warning unit 2012, and the terminal mounted in the second vehicle 10B includes the function of the other-vehicle monitoring unit 2013.

In addition, the processing described as being performed by one device may be shared and executed by a plurality of devices. Alternatively, the processing described as being performed by different devices may be executed by one device. In a computer system, what hardware configuration (server configuration) realizes each function can be flexibly changed.

The present disclosure can also be realized by supplying a computer program including the functions described in the above embodiments to a computer and causing one or more processors included in the computer to read and execute the program. Such a computer program may be provided to the computer by a non-transitory computer-readable storage medium connectable to a system bus of the computer, or may be provided to the computer via a network. Examples of non-transitory computer readable storage media include: any type of disk such as a magnetic disk (floppy (registered trademark) disk, hard disk drive (HDD), etc.), an optical disk (CD-ROM, DVD disk, Blu-ray disk, etc.); and any type of medium suitable for storing electronic instructions, such as read-only memory (ROM), random access memory (RAM), EPROM, EEPROM, magnetic cards, flash memory, and optical cards.

What is claimed is:

1. An information processing apparatus for being mounted on a vehicle, the information processing apparatus comprising a controller configured to:
   determine that a call for attention toward a risk of collision is being made to a driver of a crossing vehicle that is a vehicle whose path crosses that of an own vehicle, based on data that is transmitted from the crossing vehicle; and
   perform a predetermined process for risk avoidance, in a case where the call for attention is being made in the crossing vehicle; wherein
   the data includes position information on a vehicle that is a transmission source of the data, and
   the controller identifies the data transmitted from the crossing vehicle, based on the position information included in the data.

2. The information processing apparatus according to claim 1, wherein
   the data further includes a travel direction of a vehicle that is a transmission source of the data, and
   the controller identifies the data transmitted from the crossing vehicle, further based on the travel direction included in the data.

3. The information processing apparatus according to claim 1, wherein
   as the predetermined process, the controller notifies a driver of the own vehicle of approach of the crossing vehicle.

4. The information processing apparatus according to claim 1, wherein
   in a case where signal data about a traffic signal is being received from a roadside unit that controls a traffic light and the data is received from the crossing vehicle, the controller performs the predetermined process regardless of contents of the signal data.

5. An information processing apparatus for being mounted on a vehicle, the information processing apparatus comprising a controller configured to:
   make a call for attention toward a risk of collision to a driver of an own vehicle based on first data;
   transmit, to outside, second data indicating that the call for attention is made and including position information on the own vehicle, in a case where the call for attention is made;
   perform a predetermined process for risk avoidance, in a case where the second data is received from a crossing vehicle that is a vehicle whose path crosses that of the own vehicle; and
   identify the second data transmitted from the crossing vehicle, based on the position information included in the second data that is received.

6. The information processing apparatus according to claim 5, wherein
   the first data is road map data indicating a spot where a momentary stop is specified.

7. The information processing apparatus according to claim 5, wherein
   the first data is signal data, about a traffic signal, that is transmitted from a roadside unit that controls a traffic light.

8. The information processing apparatus according to claim 5, wherein
   the first data is image data on a road sign captured by a vehicle-mounted camera.

9. The information processing apparatus according to claim 5, wherein
   the controller generates the second data further including a travel direction of the own vehicle, and
   identifies the second data transmitted from the crossing vehicle, further based on the travel direction included in the second data that is received.

10. The information processing apparatus according to claim 5, wherein
    as the predetermined process, the controller notifies a driver of the own vehicle of approach of the crossing vehicle.

11. The information processing apparatus according to claim 5, wherein
    the controller calculates a degree of risk based on the first data and a travel state of the own vehicle, and makes the call for attention in a case where the degree of risk is at or greater than a predetermined value.

12. An information processing method that is performed by a vehicle, the information processing method comprising:
    determining that a call for attention toward a risk of collision is being made to a driver of a crossing vehicle that is a vehicle whose path crosses that of an own vehicle, based on data that is transmitted from the crossing vehicle; and
    performing a predetermined process for risk avoidance, in a case where the call for attention is being made in the crossing vehicle; wherein
    the data includes position information on a vehicle that is a transmission source of the data, and
    the data transmitted from the crossing vehicle is identified based on the position information included in the data.

13. The information processing method according to claim 12, wherein
    the data further includes a travel direction of a vehicle that is a transmission source of the data, and
    the data transmitted from the crossing vehicle is identified further based on the travel direction included in the data.

14. The information processing method according to claim 12, wherein
    as the predetermined process, a driver of the own vehicle is given a notification of approach of the crossing vehicle.

15. A non-transitory computer readable storing medium recording a computer program for causing a computer to perform an information processing method according to claim 12.

* * * * *